United States Patent [19]

Neuhaus et al.

[11] 4,436,570

[45] Mar. 13, 1984

[54] PROCESS FOR BONDING FILMS

[75] Inventors: Karl-Friedrich Neuhaus, Krefeld; Horst Müller-Albrecht, Cologne; Manfred Dollhausen, Odenthal; Hermann Perrey, Krefeld, all of Fed. Rep. of Germany

[73] Assignee: Bayer Aktiengesellschaft, Leverkusen, Fed. Rep. of Germany

[21] Appl. No.: 398,736

[22] Filed: Jul. 15, 1982

[30] Foreign Application Priority Data

Jul. 31, 1981 [DE]  Fed. Rep. of Germany ....... 3130430

[51] Int. Cl.³ ............................................. B32B 31/00
[52] U.S. Cl. .............................. 156/273.3; 156/275.5; 156/275.7; 156/307.3; 156/331.4; 156/331.7; 204/159.23; 428/423.1; 528/75
[58] Field of Search ............... 428/423.1; 204/159.23; 528/75; 156/273.3, 275.5, 275.7, 307.3, 331.4, 331.7

[56] References Cited

U.S. PATENT DOCUMENTS

| | | | |
|---|---|---|---|
| 3,028,367 | 4/1962 | O'Brien | 528/75 |
| 3,644,569 | 2/1972 | Pietsch et al. | 260/835 |
| 3,759,809 | 9/1973 | Carlick et al. | 204/159.23 |
| 3,783,151 | 1/1974 | Carlick et al. | 528/75 |
| 3,823,051 | 7/1974 | Chang | 156/331.4 |
| 3,891,523 | 6/1975 | Hisamatsu et al. | 204/159.15 |
| 3,915,935 | 10/1975 | Abraham et al. | 260/75 NP |
| 4,018,333 | 4/1977 | Blackwood | 206/343 |
| 4,092,202 | 5/1978 | Bergk et al. | 156/331 |
| 4,105,118 | 8/1978 | Williams et al. | 156/275.5 |
| 4,367,302 | 1/1983 | Le Roy et al. | 528/75 |

FOREIGN PATENT DOCUMENTS 1430422  3/1976  United Kingdom .

*Primary Examiner*—John J. Gallagher
*Attorney, Agent, or Firm*—Gene Harsh; Joseph C. Gil; Lyndanne M. Whalen

[57] ABSTRACT

A film is bonded to a substrate by applying a layer of adhesive to the film to be bonded, contacting the film with a substrate and subjecting the adhesive to high energy radiation either before, during or after the film and substrate are contacted. The adhesive layer is from 0.5 to 20 μm thick. The adhesive employed is a mixture of at least one polyisocyanate and at least one compound containing both a (meth)acryloyl group and a hydroxyl group in which the equivalent ratio of hydroxyl to isocyanate groups is from 0.8 to 1 to 1.3 to 1. The substrate to which the film is to be bonded may also be a film. Composites formed in accordance with the present invention are characterized by high initial bond strengths.

11 Claims, No Drawings

PROCESS FOR BONDING FILMS

BACKGROUND OF THE INVENTION

This invention relates to a process for bonding films to one another or to other substrates by means of a two-component adhesive containing an isocyanate component and a hydroxyl component which adhesive is cross-linkable by electron beams or UV-light.

In practice, lamination (i.e. bonding) of films to form composite films is generally carried out by means of adhesive components dissolved in organic solvents. The function of the solvent is to convert the highly viscous, partly solid adhesives into a form in which they can be applied. In order to achieve satisfactory bonding, however, the solvent must be removed from the adhesive system after application to one of the films and before the films are bonded to form a composite film.

This time-consuming process step may be avoided by using solvent-free laminating adhesives. In one known solvent-free adhesive, highly viscous urethanes containing terminal isocyanate groups are brought to the appropriate consistency by heating to temperatures around 100° C. This adhesive, upon application to the film, hardens under the effect of moisture to form a bond (cf. for example German Offenlegungsschrift No. 2,549,227). Problems encountered in using such systems include inadequate stability of these reactive adhesives in the heated applicator (pan life) and weak initial adhesion in the composite film. In addition, these known systems generally have the same disadvantages as moisture-hardening one-component adhesives, i.e., the hardening rate depends upon the quantity of moisture present in the environment which of course varies greatly according to the type of film and the time of year. To overcome this disadvantage, moisture often has to be artificially introduced into the bonding gap in the form of finely atomized water.

Ethylenically unsaturated prepolymers such as those obtained by reacting hydroxy alkyl (meth)acrylates, polyisocyanates and, optionally, polyether polyols and/or polyester polyols, have been described as solvent-free radiation-hardening adhesives which can be hardened by UV-light or electron beams. Adhesive compositions of this type are described, for example, in French Patent No. 2,361,452, U.S. Pat. No. 4,018,333 and in German Offenlegungsschrifts Nos. 2,324,822, 2,323,373 and 2,102,382. Although these ethylenically unsaturated prepolymers may produce good results as adhesive components in some applications, they have not been used successfully in laminations where layer thicknesses are typically 0.5 to 5 $\mu$m (1 $\mu$m=10$^{-3}$ mm) at most.

German Offenlegungsschrift No. 2,913,676 describes a process for the production of composite films by means of solvent-free adhesives in which oligomeric and/or polymeric esters and/or ethers containing both free isocyanate groups and free (meth)acrylate groups in one molecule are used as liquid adhesives. These systems have the same disadvantages as one-component urethane adhesive systems in which the bond reaches its maximum strength after about 1 to 3 weeks.

Solvent-free two-component systems made up of a polyol component and a (poly)isocyanate component are also known (see, for example "Kaschieren ohne Losungsmittel (Lamination without Solvents)", Papier und Kunststoff-verarbeiter, No. 7 (1978). Systems of this type generally show significantly greater final adhesion than one-component systems. In addition, they can be modified to have specific desired properties by varying the formulations. This adaptability makes these two-component systems useful for a large number of applications.

In all of the known solvent-free one-component and two-component systems, however, the composite film generally shows only minimal initial adhesion immediately after lamination. For example, when the composite film is wound into a roll, this poor initial adhesion may result in longitudinal shifting of the films (telescope effect) or in the formation of voids and wrinkles (orange-peel effect).

SUMMARY OF THE INVENTION

It is an object of the present invention to provide a process for bonding a film to a substrate in which an adhesive that may be cross-linked by high energy radiation is employed.

It is also an object of the present invention to provide a process for bonding a film to a substrate using an adhesive having such good initial adhesion that longitudinal shifting and formation of voids and wrinkles are substantially eliminated.

It is another object of the present invention to provide a process for bonding films to each other to form a composite using an adhesive material which produces bonds having high initial strength.

These and other objects which will be apparent to those skilled in the art are accomplished by applying a layer from 0.5 to 20 $\mu$m thick of an adhesive which may be cross-linked by high energy radiation to the film to be bonded. This film to be bonded is subsequently contacted with a substrate. The adhesive layer may be subjected to high energy radiation before, during or after contact of the film to be bonded with the substrate. The adhesive is a mixture of (i) at least one polyisocyanate and (ii) at least one compound containing both a (meth)acryloyl group and a hydroxyl group in which the equivalent ratio of hydroxyl groups to isocyanate groups is from 0.8:1 to 1.3:1. The substrate to which the film is to be bonded may also be a film of the same composition.

DETAILED DESCRIPTION OF THE INVENTION

The present invention relates to a process for bonding films to one another or to other substrates by applying an adhesive cross-linkable by high-energy radiation to the film to be bonded in a layer thickness of from 0.5 to 20 $\mu$m, combining the coated film with a film of the same type or with another substrate and cross-linking the adhesive applied to the film by high-energy radiation. This cross-linking may be carried out before, during or after the coated film is contacted with the substrates. The adhesive employed is a two-component mixture made up of (i) at least one polyisocyanate and (ii) at least one compound containing both (meth)acryloyl groups and also hydroxyl groups. This adhesive mixture may optionally contain a photoinitiator and/or copolymerizable monomers and/or other additives and auxiliaries. Both the polyisocyanate and the compound containing hydroxyl and (meth)acryloyl groups are used in quantities such that the equivalent ratio of hydroxyl groups to isocyanate groups is from 0.8:1 to 1.3:1.

In the context of the present invention, the expression "(meth)acryloyl" applies both to derivatives of methacrylic acid and also to derivatives of acrylic acid and mixtures thereof.

Suitable polyisocyanates for the adhesive composition of the present invention are aliphatic, cycloaliphatic, araliphatic, aromatic and heterocyclic polyisocyanate of the type described, for example, by W. Siefken in Justus Liebigs Annalen der Chemie 562, pages 75 to 136. Such polyisocyanates include those corresponding to the formula

in which n=2 to 4, preferably 2 to 3 and

Q represents an aliphatic hydrocarbon radical containing from 4 to 15 (preferably from 5 to 13) carbon atoms; an aromatic hydrocarbon radical containing from 6 to 15 (preferably from 6 to 13) carbon atoms; or an aliphatic hydrocarbon radical containing from 8 to 15 (preferably from 8 to 13) carbon atoms.

Specific examples of such polyisocyanates are: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane (DE-AS No. 12 02 785 and U.S. Pat. No. 3,401,190); 2,4- and 2,6-hexahydrotolylene diisocyanate and mixtures of these isomers; hexahydro-1,3- and/or -1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate and mixtures thereof; naphthalene-1,5-diisocyanate; 2,4- and 2,6-tolylene diisocyanate substituted on the aromatic nucleus by one or more alkyl groups containing from 1 to 3 carbon atoms; and 4,4'- and 2,4'-diisocyanato diphenyl methane substituted on the aromatic nuclei by one or more alkyl groups containing from 1 to 3 carbon atoms. It is also possible to use higher isocyanates such as triphenyl methane triisocyanate and distillation residues from the production of diphenyl methane diisocyanate.

Other suitable polyisocyanates include the NCO-containing reaction products of one of the above-mentioned diisocyanates and a polyol such as, for example, the addition product of tolylene diisocyanate with trimethylol propane or even the reaction product of 3 moles of hexamethylene diisocyanate and 1 mole of water (biuret).

Particularly preferred polyisocyanates for the present invention are aromatic diisocyanates such as 2,4-diisocyanato-toluene, 2,6-diisocyanato-toluene, mixtures of these isomers, 2,4-diisocyanato diphenyl methane, 4,4'-diisocyanato diphenyl methane and mixtures of these isomers or isocyanato-group-containing reaction products of these diisocyanates with low molecular weight dihydric and/or trihydric alcohols (i.e., alcohols having molecular weights in the range from 62 to 700). Such low molecular weight alcohols are ethylene glycol, 1,2-butane diol, trimethylol propane, 1,2-propane diol, dipropylene glycol and polypropylene glycols having molecular weights in the above-mentioned range. In the context of the present invention, reaction products containing isocyanate groups are understood to be both substantially pure reaction products, (such as the triisocyanate-containing urethane groups obtainable by reacting 3 moles of 2,4-diisocyantotoluene with 1 mole of trimethylol propane) and also polyisocyanates modified with substoichiometric quantities of alcohols of the above-mentioned type (such as 4,4'-diisocyanato diphenyl methane liquefied with from 0.1 to 0.3 mole of tri- and/or tetra-propylene glycol per mole of diisocyanate). Polyisocyanates of the type mentioned above which are liquid at room temperature are particularly preferred.

Any compound containing aliphatic hydroxyl groups and (meth)acryloyl groups or mixtures of these compounds which has a hydroxyl number of from 20 to 600 (preferably from 20 to 250), contains (on a statistical average in the case of mixtures) from 1 to 3 (preferably from 1 to 2) hydroxyl groups per molecule and has for every 100 molecular weight units from 0.012 to 1.12 (preferably from 0.03 to 0.5) olefinic double bonds present in the form of (meth)acryloyl groups may be used in the present invention as component (ii) of the adhesive. The compound or mixture of compounds should preferably be liquid at room temperature.

Examples of appropriate compounds containing both hydroxyl and (meth)acryloyl groups are esterification products of (meth)acrylic acid, reaction products of (meth)acrylic acid esters and reaction products of (meth)acrylic acid halides with aliphatic saturated dihydric to hexahydric alcohols, cycloaliphatic diols, araliphatic dihydric alcohols or saturated or unsaturated polyesters. From 0.3 to 0.75 mole of (meth)acrylol compound is generally used for each mole of hydroxyl groups.

Aliphatic saturated dihydric to hexahydric alcohols, more particularly dihydric to tetrahydric alcohols having a molecular weight in the range from 62 to 4000 which may be used to form such a reaction product are ethylene glycol, 1,3-propane diol, neopentyl glycol, 1,4-butane diol, 1,6-hexane diol, 1,10-decane diol, glycerol, trimethylol propane, pentaerythritol, dipentaerythritol and the alkoxylation products of the dihydric to hexahydric alcohols with 1,2-alkylene oxides, such as ethylene oxide or propylene oxide or mixtures thereof.

Cycloaliphatic diols which may be used to form the reaction product (ii) should have a molecular weight in the range from 114 to 400. Such diols include cyclo-1,4-hexane diol and 4,4'-dihydroxy cyclohexyl-2,2-alkanes, (e.g., 4,4'-dihydroxy cyclohexyl-2,2-propane).

Araliphatic dihydric alcohols optionally containing from 1 to 4 ether oxygen atoms and having a molecular weight in the range from 316 to 600 (e.g., bis-(ethoxylated) bisphenol A and bis-(propoxylated) bisphenol A) may also be used to produce the reaction product which is component (ii) of the adhesive composition.

Saturated or unsaturated (preferably saturated) polyesters which may be used to make component (ii) of the adhesive used in the present invention should have an OH-number in the range from 20 to 300, preferably from 20 to 150, and contain at least 2 free hydroxyl groups and at least 1 polycarboxylic acid or its anhydride. Dicarboxylic acids, such as maleic acid, fumaric acid, mesaconic acid, citraconic acid, itaconic acid, succinic acid, glutaric acid, adipic acid, sebacic acid, phthalic acid, isophthalic acid, terephthalic acid, trimellitic acid, hexahydrophthalic acid, tetrahydrophthalic acid, endomethylene tetrahydrophthalic acid and methyl hexahydrophthalic acids are preferred. The polyester is preferably derived from one of the above-described alcohols.

Where alcohols containing olefinic double bonds are used and particularly where unsaturated polyester polyols are used, the olefinic group content of these synthesis components is not taken into consideration when calculating the double bond content of component (ii).

Other examples of suitable components containing both hydroxyl groups and (meth)acryloyl groups are reaction products of polyhydric alcohols (such as those described above) with polyisocyanates (of the type described above) and compounds containing both hydroxyl groups (preferably alcoholic hydroxyl groups) and (meth)acryloyl groups. Examples of the latter type of compound are 2-hydroxyethyl, 2-hydroxypropyl, 2-hydroxybutyl, 3-hydroxypropyl, 4-hydroxybutyl or 6-hydroxyhexyl acrylate or methacrylate, preferably 2-hydroxyethyl acrylate, 2-hydroxypropyl acrylate or 4-hydroxybutyl acrylate. In the production of compounds of this type, the synthesis components are generally used in quantities such that, for every mole of hydroxyl groups in the polyhydric alcohols, there are from 0.5 to 1.5 moles of isocyanate groups in the polyisocyanate and from 0.25 to 0.75 moles of hydroxyl groups in the compounds containing (meth)acryloyl groups. Compounds containing hydroxyl groups and (meth)acryloyl groups and (in the present case) urethane groups are obtained as the reaction products.

Other components (ii) suitable for use in the process of the present invention are reaction products of polyepoxides and (meth)acrylic acid in which from 0.8 to 1.1 (preferably from 0.9 to 1 mole) of (meth)acrylic acid is used for each mole of epoxide groups, i.e. per epoxide equivalent. Polyepoxides as used herein are compounds which contain (on a statistical average) more than one 1,2-epoxide group, preferably from 1.6 to 6 epoxide groups and most preferably from 1.6 to 3 epoxide groups per molecule.

Suitable polyepoxide compounds are polyglycidyl ethers of polyhydric phenols. Examples of phenols which may be used to make such ethers are pyrocatechol, resorcinol, hydroquinone, 4,4'-dihydroxy diphenyl methane, 4,4'-dihydroxy-3,3'-dimethyl diphenyl methane, 4,4'-dihydroxy diphenyl dimethyl methane (bisphenol A), 4,4'-dihydroxy diphenyl methyl methane, 4,4'-dihydroxy diphenyl cyclohexane, 4,4'-dihydroxy diphenyl, 4,4'-dihydroxy diphenyl sulfone, tris-(4-hydroxyphenyl)-methane, chlorination and bromination products of the above-mentioned diphenols (particularly those of bisphenol A), novolaks (i.e., products of the reaction of monohydric or polyhydric phenols with aldehydes, particularly formaldehyde, in the presence of acid catalysts). Diphenols obtained by esterifying 2 moles of the sodium salt of an aromatic oxycarboxylic acid with 1 mole of a dihalogen alkane or dihalogen dialkyl ether (cf. British Pat. No. 1,017,612) or polyphenols obtained by condensing phenols and longchain haloparaffins containing at least two halogen atoms (cf. British Pat. No. 1,024,288) may also be employed.

Glycidyl ethers of polyhydric alcohols, for example of 1,4-butane diol, 1,4-butene diol, glycerol, trimethylol propane, pentaerythritol and polyethylene glycols, may also be used in accordance with the invention. Triglycidyl isocyanurate and N,N'-diepoxypropyl oxamide are also useful in the present invention.

It is also possible to use glycidyl esters of polybasic aromatic, aliphatic and cycloaliphatic carboxylic acids in the production of component (ii) of the adhesive employed in the present invention. Examples of such esters are phthalic acid diglycidyl ester, isophthalic acid diglycidyl ester, terephthalic acid diglycidyl ester, tetrahydrophthalic acid diglycidyl ester, adipic acid diglycidyl ester, hexahydrophthalic acid diglycidyl ester, (which may be substituted by methyl groups). Glycidyl esters of reaction products of 1 mole of an aromatic or cycloaliphatic dicarboxylic acid anhydride and ½ mole of a diol or 1/n mole of a polyol containing n hydroxyl groups may also be employed. Such glycidyl carboxylic acid esters include those corresponding to the general formula

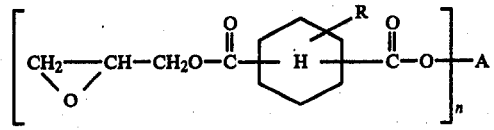

in which
A represents an at least difunctional residue of an aliphatic hydrocarbon optionally interrupted by oxygen and/or cycloaliphatic rings or the difunctional residue of a cycloaliphatic hydrocarbon,
R represents hydrogen or alkyl radicals containing from 1 to 3 carbon atoms and
n represents a number of from 2 to 6.

Mixtures of glycidyl carboxylic acid esters corresponding to the above-given general formula (cf. British Pat. No. 1,220,702) may also be employed.

Preferred polyepoxide compounds are polyglycidyl ethers of polyhydric phenols (particularly of bisphenol A), phthalic acid glycidyl ester, isophthalic acid diglycidyl ester, terephthalic acid diglycidyl ester, polyglycidyl esters of cycloaliphatic dicarboxylic acids (particularly hexahydrophthalic acid diglycidyl ester) and polyepoxides of the reaction product of n moles of hexahydrophthalic acid anhydride and/or phthalic acid anhydride and 1 mole of a polyol containing n hydroxyl groups (n=an integer of from 2 to 6), particularly of 3 moles of hexahydrophthalic acid anhydride and/or phthalic acid anhydride and 1 mole of 1,1,1-trimethylol propane.

The above-mentioned polyepoxides may also be preextended by reaction with aliphatic or aromatic dicarboxylic acids, with dimercaptans or H₂S or with amines or ammonia in cases where a higher molecular weight of the starting component is required.

The reaction compounds described above as appropriate materials for component (ii) of the adhesive mixture may be obtained by esterifying the polyols described above with (meth)acrylic acid, preferably under acid-catalyzed azeotropic conditions. They may also be made by transesterifying the polyols with suitable (meth)acrylic acid esters (preferably using a transesterification catalyst) or by reacting a (meth)acrylic acid halide with the polyols (preferably in the presence of a basic auxiliary such as, for example a tertiary amine) using techniques known to those in the art. The oligoalcohols containing (meth)acryloyl groups, which are derived from polyester polyols, may be produced in a one-pot process by reacting (meth)acrylic acid, the alcohols and the carboxylic acids required for synthesizing the polyester polyol under acid-catalyzed azeotropic conditions. These oligoalcohols containing (meth)acryloyl groups are preferably obtained in known manner by acid-catalyzed esterification in the presence of an entraining agent and the usual polymerization inhibitors.

Standard commercial organic and inorganic acids or acid ion exchangers may be used as esterification catalysts. It is particularly preferred to use p-toluene sulfonic acid in quantities of from 0.1 to 3 wt. % (based on the total weight of (meth)acrylic acids and polyols). Suitable entraining agents for removing the water of reaction are aliphatic, cycloaliphatic, or aromatic hydrocarbons, their chlorination products or mixtures thereof, particularly those boiling at temperatures in the range from 40° C. to 140° C. (preferably at temperatures in the range from 70° C. to 120° C.). Preferred hydrocarbons are hexane and its isomers, cyclohexane and toluene. The quantity of entraining agent employed may range from 10 to 60 wt. % (based on the total weight of (meth)acrylic acid and polyol). In general, the entraining agent should be used in a quantity such that azeotropic dehydration is guaranteed and the sump temperature of the reaction mixture does not exceed 120° to 140° C.

In one typical method for the production of a compound containing both hydroxyl and (meth)acryloyl groups suitable for the present invention, one gram equivalent of any of the above-described polyols is combined with from 0.3 to 0.75 gram equivalents of (meth)acrylic acid, the polymerization inhibitors, the esterification catalysts and the entraining agents. The water formed is quickly removed by passing a gentle stream of air through the vessel. The progress of the reaction may readily be followed by titrating the acid present in the mixture. The reaction is over when an acid number (mg of KOH/g of substance) of less than 5 is reached. Removal of the entraining agent by distillation leaves a compound useful as component (ii) of the adhesive used in the invention. This compound is in the form of a liquid, pale yellow colored substance.

Production of a compound containing oxycarbonyl amino groups in the aliphatic chain suitable for use as component (ii) of the adhesive in the present invention may be carried out by reacting compounds containing both hydroxyl and (meth)acryloyl groups or by reacting hydroxyl alkyl (meth)acrylates with polyisocyanates and polyalcohols. In such reactions, from 0.5 to 1.5 NCO gram equivalents of the polyisocyanate and from 0.25 to 0.75 OH gram equivalents of the ethylenically unsaturated alcohol should preferably be used for each OH gram equivalent of the polyol.

Particularly preferred polyol components are difunctional polyester polyols having OH-numbers (mg of KOH/g of substance) in the range from 20 to 150.

Particularly preferred polyisocyanate components are difunctional polyisocyanates such as 2,4- and/or 2,6-tolylene diisocyanate, 2,4- and/or 4,4'-diisocyanato diphenyl methane, 4,4'-diisocyanato dicyclohexyl methane, isophorone diisocyanate or hexamethylene diisocyanate.

The reaction of the polyisocyanate with ethylenically unsaturated alcohols and polyols to form oligoalcohols containing (meth)acryloyl groups may be carried out at temperatures in the range from 20° to 90° C. (preferably from 40° to 70° C.) either in a one-step process or in several stages. Where a multistage process is used, it is preferred to react the polyisocyanate with the ethylenically unsaturated alcohol in the first stage, and then add the polyol.

The urethane-forming reaction may be catalyzed in known manner by using, for example, tin octoate, dibenzyl tin dilaurate, caprolactam or tertiary amines. The oligoalcohols containing (meth)acryloyl groups and urethane groups may be protected against premature and undesirable polymerization by the addition of suitable inhibitors and antioxidants. The inhibitor and/or antioxidant should each be used in a quantity of from 0.001 to 0.1 wt. % (based on the mixture as a whole).

The reaction products of polyepoxides and (meth)acrylic acid which have previously been described as suitable hydroxyl and (meth)acryloyl group-containing materials made by reacting one epoxide gram equivalent of a polyepoxide with from 0.8 to 1.1 moles (preferably from 0.9 to 1 mole) of (meth)acrylic acid. Reaction products with acrylic acid are preferred.

Addition of the acrylic and/or methacrylic acid with the polyepoxides may be carried out by known methods. Examples of such processes are described in U.S. Pat. No. 3,301,743 and in U.S. Pat. No. 2,324,851. The addition reaction may be carried out in the presence or absence of solvents. If a solvent is used, appropriate solvents include butyl acetate, ethyl acetate, acetone, ethylmethyl ketone, diethyl ketone, cyclohexane, cyclohexanone, cyclopentane, cyclopentanone, n-heptane, n-hexane, n-octane, iso-octane, methylene chloride, chloroform, 1,1-dichloroethane, 1,2-dichloroethane, 1,1,2-trichloroethane, and carbon tetrachloride. If desired, the addition of the (meth)acrylic acid may be carried out in the presence of from about 0.01 to 3 wt. % (based on starting epoxide) catalyst. Suitable catalysts include tertiary amines, alkali hydroxides, alkali salts of organic carboxylic acids, bis-(hydroxyalkyl)-sulfides, sulfonium compounds, phosphonium compounds, phosphines, amines or stibines. It is particularly advantageous to carry out the reaction at temperatures in the range from 40° to 90° C., although the reaction may be carried out at temperatures above or below these limits. To protect the resulting reaction products against undesirable premature polymerization, it is generally advisable to add from 0.001 to 0.1 wt. % (based on the mixture as a whole) of polymerization inhibitors during the actual production process.

The compounds containing hydroxyl and (meth)acryloyl groups suitable for use in the present invention which have been produced by any one of the processes outlined above generally contain sufficient polymerization inhibitors to protect them from premature polymerization. In cases where the inhibiting effect of the polymerization inhibitors used during production is inadequate, stabilization may be achieved by means of inhibitors generally used by those skilled in the art.

Such inhibitors include phenols and phenol derivatives (preferably sterically hindered phenols containing $C_1$–$C_6$-alkyl substituents in both o-positions to the phenolic hydroxyl group), amines (preferably secondary acrylamines) and their derivatives, quinones, copper(I)-salts of organic acids or addition compounds of copper-(I)halides with phosphites.

Specific examples of polymerization inhibitors are 4,4'-bis-(2,6-di-tert.-butylphenol), 1,3,5-trimethyl-2,4,6-tris-(3,5-di-tert.-butyl-4-hydroxybenzyl)-benzene, 4,4'-butylidene-bis-(tert.-butyl-m-cresol), 3,5-di-tert.-butyl-4-hydroxybenzyl phosphonic acid diethyl ester, N,N-bis-($\beta$-naphthyl)-p-phenylene diamine, N,N'-bis-(1-methylheptyl)-p-phenylene diamine, phenyl-$\beta$-naphthylamine, 4,4'-bis-($\alpha,\alpha$-dimethylbenzyl)-diphenylamine, 1,3,5-tris-(3,5-di-tert.-butyl-4-hydroxyhydrocinnamoyl)-hexahydro-s-triazine, hydroquinone, p-benzoquinone, 2,5-di-tert.-butylhydroquinone, toluhydroquinone, p-tert.-butyl-pyrocatechol, 3-methylpyrocatechol, 4-ethylpyrocatechol, chloranil, naphthoquinone, copper naphthanate, copper octoate, Cu(I)Cl/triphenylphosphite, Cu(I)Cl/trimethyl phosphite, Cu(I)Cl/trichloroethyl phosphite, Cu(I)Cl/tripropyl phosphite, p-nitrosodimethylaniline.

Other suitable stabilizers are described in "Methoden der Organischen Chemie" (Houben-Weyl), 4th Edition, Vol. XIV/I, pages 433–452, 756, Georg Thieme Verlag, Stuttgart, 1961. One example of particularly suitable stabilizer is 2,5-di-tert.-butylhydroquinone and/or hydroquinone monomethyl ether used in a concentration of from 0.001 to 0.05 wt. % (based on the quantity of component (ii)).

To produce the adhesives according to the invention, the polyisocyanate is mixed with the compound containing both hydroxyl and (meth)acryloyl groups in quantities such that the ratio of the individual components is generally from 0.8 to 1.3 (preferably from 1.0 to 1.2) moles of isocyanate groups are available for each mole of hydroxyl groups.

The optimum quantitative ratio depends upon the type of films to be bonded and the specific processing conditions. The most suitable mixing ratio may be readily determined both qualitatively and also quantitatively by simple small-scale tests.

Mixing of the polyisocyanate and the compound having both hydroxyl and (meth)acryloyl groups to form the radiation-hardening adhesive composition may be carried out by methods known to those in the art such as stirring, kneading, shaking or grinding.

The radiation-hardening adhesive composition of the present invention and any photoinitiator present generally has a low viscosity. In cases where the adhesive composition cannot be applied in the usual way due to its viscosity, it is possible to heat both components of the adhesive separately and/or the formulation obtainable by mixing the components to temperatures of up to 120° C. (preferably from 30° to 70° C.) to facilitate application. It is also possible to reduce the viscosity (particularly where ethylenically unsaturated compounds containing urethane groups are used as component (ii)) by mixing the adhesive composition with copolymerizable monomers. The copolymerizable monomers may be added to each component of the adhesive individually or to a mixture of the components. It is preferred to mix the copolymerizable monomers with the compound containing hydroxyl and (meth)acryloyl groups.

Copolymerizable monomers suitable for admixture with the adhesive composition of the present invention include: esters of acrylic or methacrylic acid with aliphatic $C_1$-$C_8$, cycloaliphatic $C_5$-$C_6$, araliphatic $C_7$-$C_8$-monoalcohols, such as methyl acrylate, ethyl acrylate, n-propyl acrylate, n-butyl acrylate, methylhexyl acrylate, 2-ethylhexyl acrylate, and the corresponding methacrylic acid esters, cyclopentyl acrylate, cyclohexyl acrylate, 5-ethyl-5-methylol acryloyl-1,3-dioxane, benzyl acrylate, β-phenylethyl acrylate and the corresponding methacrylic acid esters. Diacrylates and polyacrylates and also dimethacrylate and polymethacrylates of glycols containing from 2 to 6 carbon atoms and polyols containing from 3 to 4 hydroxyl groups and from 3 to 6 carbon atoms, such as ethylene glycol diacrylate, 1,3-propane diol diacrylate, 1,4-butane diol diacrylate, 1,6-hexane diol diacrylate, trimethylol propane triacrylate, pentaerythritol tri- and tetra-acrylate and corresponding methacrylates, also di(meth)acrylates of polyether glycols of glycol, 1,3-propane diol, 1,4-butane diol and tetraethoxylated trimethylol propane tris-acrylate may also be used. Aromatic vinyl and divinyl compounds such as styrene, methyl styrene and divinyl benzene are also appropriate copolymerizable monomers. N-methylol acrylamide or N-methylol methacrylamide and corresponding n-methylol alkyl ethers containing from 1 to 4 carbon atoms in the alkyl ether group and corresponding N-methylol allyl ethers, particularly N-methoxy methyl(meth)acrylamide, N-butoxymethyl(meth)acrylamide and N-allyloxymethyl(meth)acrylamide may also be mixed with the adhesive composition. Vinyl alkyl ethers containing from 1 to 4 carbon atoms in the alkyl group, such as vinyl methyl ether, vinyl ethyl ether, vinyl propyl ether and vinyl butyl ether are also suitable monomers. Trimethylol propane diallyl ether mono(meth)acrylate, vinyl pyridine, N-vinyl carbazole, triallyl phosphate, triallyl isocyanurate and others known to those in the art may also be included to the adhesive composition employed in the present invention.

Copolymerizable monomers which are esters of acrylic or (meth)acrylic acid with monoalcohols especially 5-ethyl-5-methylolacryloyl-1,3-dioxane, are particularly preferred monomers. Mixtures of one or more of the above-mentioned monomers may also be used. The monomers may be used in an amount between 0 and 70 wt. %, preferably between 0 and 40 wt. % (based on the adhesive mixture).

If desired, the two-component adhesive composition of the present invention may be mixed with inert solvents. Suitable solvents include: butyl acetate, ethyl acetate, acetone, ethylmethyl ketone, diethyl ketone, cyclohexane, cyclohexanone, cyclopentane, cyclopentanone, n-heptane, n-hexane, n-octane, iso-octane, toluene, xylene, methylene chloride, chloroform, 1,1-dichloroethane, 1,2-dichloroethane, 1,1,2-trichloroethane and carbon tetrachloride.

The solvent may be used in an amount between 0 and 50 wt. %, preferably between 0 and 40 wt. %, based on the mixture of components, (i) and (ii) in the adhesive mixture. However, solvent-free adhesives are most preferably used in the process of the present invention.

It is of course also possible to use mixtures of additional monomers and solvents within the quantitative ratios indicated.

The finished two-component adhesive composition may be applied by means of machines and methods known to those in the art such as screen rollers, metering rollers, coating knives or trituration (optionally in conjunction with extension of the adhesive).

The adhesives used in the present invention generally have a pot life of up to 12 hours. They must be processed within this period after the individual components have been mixed.

The process of the present invention is suitable for bonding films either to one another or to other substrates. In the context of the present invention, other substrates means any flexible or non-flexible substrate such as paper, cardboard, plastics or photographic papers. Films having the same chemical composition as the film to which the adhesive is applied are preferred substrates but films having a different composition may also be used. Accordingly, the process of the present invention is particularly suitable for the production of composite films.

Examples of suitable film materials are polyolefins such as polyethylene, cellulose esters, polyvinyl acetate, polystyrene, polycarbonate (particularly those based on bisphenol A), polyesters (particularly those based on polyethylene and polybutylene terephthalate), PVC, polyamide (e.g., polyamide-6 or polyamide-66) or aluminum. A composite film produced by the process of the present invention, for example, may be used as the "other substrate" so that composite films containing 3 or more individual films may be obtained by the process according to the invention. Examples of suitable composite films which may be used as a "substrate" for bonding to another film in the process of the present invention are polyethylene/polyamides, polypropylene/polyamides or polyolefin films to other film materials, such as polyesters, (e.g., polyethylene terephthalate).

Other suitable films and composite films are described in Ullmann's Encyclopadie der technischen Chemie, 4th Edition, Vol. II, pages 673 et seq.

The thickness of the films used depends upon the required stiffness of the composite film. In general, overall thicknesses of from 10 to 250 $\mu$m are sufficient.

The surface of the film intended to be coated with the radiation-hardening two-component adhesive composition may be subjected to a pretreatment before coating. Such pretreatment improves the bond between the film and the adhesive thereby ensuring uniform application of the adhesive and increasing its bond strength. In the case of polyolefins, for example, good results are obtained with a standard corona treatment. It is of course also possible to promote the adhesion of the radiation-hardening composition to the supporting film by other measures such as application of a suitable adhesion-promoting layer.

The thickness of the two-component adhesive layer is dependent upon specific requirements and upon the adhesiveness of the radiation-hardening adhesive composition. In general, layer thicknesses of from 0.5 to 20 $\mu$m, preferably from 0.5 to 5 $\mu$m and, most preferably 1 to 3 $\mu$m will be sufficient. In most cases, it is only necessary to coat the film to be bonded to the substrate with the adhesive. In principle, however, the adhesive may also be applied to both surfaces to be bonded or only to that surface of the substrate which is to be bonded to the film.

Hardening of the two-component adhesive composition optionally in admixture with other copolymerizable monomers, may be carried out by means of high-energy radiation, such as UV-light, electron beams, gamma rays or by use of radical-yielding substances, such as thermal polymerization initiators. The adhesive is preferably hardened by one of the abovedescribed forms of high-energy radiation. It is particularly preferred to harden the adhesives used in the present invention by exposure to UV-light. Photoinitiators generally have to be added to the adhesive if UV-light is employed.

Suitable photoinitiators are known to those in the art. Suitable photoinitiators are benzophenone, aromatic ketone compounds derived from benzophenone, such as alkyl benzophenones, halogen-methylated benzophenones (according to German Offenlegungsschrift No. 1,949,010), Michlers ketone, anthrone and halogenated benzophenones. Other suitable photoinitiators are benzoin and its derivatives disclosed for example in German Offenlegungsschrifts Nos. 1,769,168; 1,769,853; 1,769,854; 1,807,297; 1,807,301; 1,919,678 and German Auslegeschrift No. 1,694,149. Other effective photoinitiators are anthraquinone and many of its derivatives, for example $\beta$-methyl anthraquinone, tert.-butyl anthraquinone and anthraquinone carboxylic acid esters, and oxime esters according to German Offenlegungsschrift No. 1,795,089. Other suitable photoinitiators are the phenyl glyoxylic acid esters described in German Offenlegungsschrift No. 2,825,955.

Particularly suitable photoinitiators are benzil dimethyl ketal, benzoin ethers, phenyl glyoxylic acid esters (according to German Offenlegungsschrift No. 2,825,955) and the benzophenone/amine system (U.S. Pat. No. 3,759,807).

The most suitable photoinitiators for the particular photo cross-linkable system may readily be determined by a few simple small-scale tests.

Irradiation may be carried out at different times depending upon the type and reactivity of the radiation-hardening two-component adhesive. Irradiation is generally carried out after the film to be bonded has been combined with a film of the same type or with the substrate. It can be of advantage in some cases to carry out irradiation before or during lamination of the films for cross-linking purposes. In cases where the adhesives used in accordance with the invention are irradiated before the surfaces to be bonded are combined, the liquid adhesives are converted by the radiation-induced polymerization reaction into extremely tacky layers still containing isocyanate and hydroxyl groups.

The light sources normally used in the reproduction field, which generally emit in the range from 2500 to 500 Å and preferably in the range from 3000 to 4000 Å, are particularly suitable for irradiating the composite film to be formed with the two-component adhesive of the present invention. Examples of suitable light sources are carbon arc lamps, xenon lamps, fluorescent UV lamps, low pressure mercury lamps, high pressure mercury lamps which, in addition to visible light, emit a quantity of ultra-violet light which is particularly effective for polymerization.

The exposure time will depend upon the type of light source used. Irradiation may be carried out at room temperature and also at elevated temperatures.

The radiation-hardening, preferably solvent-free two-component adhesive compositions of the present invention are distinguished by their extremely good initial adhesion values. The final adhesion values are reached after a few hours to days. The compound containing by hydroxyl and (meth)acryloyl groups used in accordance with the present invention is converted by irradiation into a prepolymer containing hydroxyl groups. The final adhesion values are obtained after the isocyanate addition reaction which for the most part takes place after the polymerization reaction.

The present invention is illustrated in the following Examples which describe a few typical embodiments.

EXAMPLES

The viscosity values given in the examples below were determined either in a 4-mm-flowout cup according to DIN 53 211 (in seconds) or by means of a Haake type VI 02V Viscotester (in Pa.s up to 400 Pa.s).

Philips high-pressure mercury lamps (type HPK, power consumption 125 W) or Hanovia high-pressure mercury lamps (power consumption 80 W/cm) were used as the light source in each of these Examples.

The percentages and parts given in these Examples represent percentages and parts by weight, unless otherwise indicated. The figures given in tables 1, 3, 5, 7 and 10 refer to parts by weight. The delamination resistance indicated in tables 2, 4, 6, 8 and 9 (1 p/15 mm=0,0167

N/inch) were determined as force necessary to delaminate laminates with a width of 15 mm at a delamination speed of 100 mm/min. at an angle of 90°.

The compounds containing acryloyl groups and hydroxyl groups ("oligoalcohols") produced as described hereinafter were used in the Examples.

Oligoalcohol I 174 g of tolylene diisocyanate, 0.17 g of tin(II)octoate and 0.17 g of 2,5-di-tert.-butyl hydroquinone were heated to 60° C. in a 4 liter flask equipped with a stirrer, dropping funnel, gas inlet pipe and thermometer. Thereafter, 116 g of hydroxy ethyl acrylate were added dropwise over a period of 30 minutes (during which a gentle stream of air was passed over) at a rate such that the internal temperature did not exceed 65° C. After an NCO-value of 14.1 wt. % had been reached, 2000 g of a polyester diol (OH number 56) based on adipic acid, ethylene glycol, diethylene glycol and 1,4-butane diol were added and the mixture stirred at B 65° C. until the NCO-value was less than 0.1 wt. %. A pale yellow oligoalcohol having an OH number of 31 and containing 0.044 olefinic double bonds per 100 molecular weight units was obtained.

Oligoalcohol II 348 g of tolylene diisocyanate, 0.35 g of tin(II)octoate and 0.35 g of di-tert.-butyl hydroquinone were heated to 60° C. in a 4 liter flask equipped with a stirrer, dropping funnel, gas inlet pipe and thermometer. 232 g of hydroxyethyl acrylate were then added dropwise over a period of 1 hour at a rate such that the internal temperature did not exceed 65° C. After an NCO-value of 14.1 wt. % had been reached, 3000 g of propoxylated trimethylol propane having an OH number of 56 were added and the mixture stirred at 65° C. until the NCO-value was less than 0.1 wt. %. A pale yellow oligoalcohol having an OH number of 20 and containing 0.056 olefinic double bonds per 100 molecular weight units was obtained.

Oligoalcohol III 380 g of bisphenol-A-diepoxide (epoxy equivalent 190), 0.35 g of p-methoxyphenol and 3.7 g of thiodiglycol were heated to 70° C. in a 2 liter flask equipped with a stirrer, dropping funnel, gas inlet pipe and thermometer. 144 g of acrylic acid were added dropwise over a period of 2 hours during which a gentle stream of air was passed over. Thereafter the mixture was stirred at 75° to 85° C. until the acid number was less than 5. A pale yellow ethylenically unsaturated oligoalcohol was obtained. This product had an OH number of 212 and contained 0.38 olefinic double bonds per 100 molecular weight units.

Oligoalcohol IV 672 g of ethoxylated trimethylol propane (OH number 250), 114 g of acrylic acid, 6.5 g of p-toluene sulfonic acid, 0.65 g of di-tert.-butyl hydroquinone, 0.41 g of p-methoxyphenol and 180 g of toluene in a 3 liter flask equipped with a gas inlet pipe, stirrer, water separator and thermometer were rapidly freed from water by circulating a gentle stream of air through the flask. When the acid number was less than 5, the toluene was distilled off in vacuo and the residue was desorbed for 1 hour at 90°-100° C./50 mbar while air was passed through. An ethylenically unsaturated oligoalcohol was obtained in the form of a low-viscosity liquid having an OH number of 93 and containing 0.25 olefinic double bonds per 100 molecular weight units.

Oligoalcohol V

An oligoalcohol having an OH number of 62 and containing 0.18 olefinic double bonds per 100 molecular weight units was obtained in the same way as oligoalcohol IV, except that 965.5 g of a propoxylated and terminally ethoxylated trimethylol propane (OH number 174) were used.

The following unsaturated photoinitiators were used in the Examples:

Photoinitiator I 305 g of ethoxylated trimethylol propane (OH number 550), 225 g of benzophenone-2-carboxylic acid, 6.7 g of p-toluene sulfonic acid, 0.67 g of di-tert.-butyl hydroquinone, 0.54 g of p-methoxyphenol and 135 g of toluene in a 2 liter 3-necked flask equipped with a stirrer, thermometer, water separator and gas inlet pipe were dehydrated to an acid number of less than 8 while nitrogen was passed through. Thereafter, 140 g of acrylic acid were added and the mixture was rapidly freed from water while air was passed through. When an acid number of less than 5 had been reached, the solvent was distilled off in vacuo and the residue was desorbed at 80°-90° C./50 mbar while air was passed through. The ethylenically unsaturated photoinitiator containing benzophenone could be used without further purification.

Photoinitiator II 305 g of ethoxylated trimethylol propane (OH number 550), 164 g of phenyl glyoxylic acid methyl ester and 4.7 g of p-toluene sulfonic acid were transesterified in vacuo at 80° to 100° C. in a 2 liter 3-necked flask equipped with a stirrer, thermometer, water separator and gas inlet pipe. On completion of the reaction, 140 g of acrylic acid, 0.67 g of di-tert.-butyl hydroquinone, 0.54 g of p-methoxyphenol and 130 g of toluene were added and the mixture was rapidly freed from water while a stream of air was passed through. When an acid number of less than 5 had been reached, the toluene was separated off in vacuo and the residue desorbed at 80°-90° C./50 mbar. The residual ethylenically unsaturated photoinitiator could be used without further purification.

EXAMPLE 1

A mixture of 4,4'- and 2,4-diisocyanato diphenyl methane (40:60) and initiator II were added to oligoalcohols I, IV and V as shown in Table 1. The mixture obtained was applied to a polyethylene film pretreated by corona discharge in a quantity of approximately 2 g/m². A polyamide film was placed on top of the coated polyethylene film to form a composite film which was then irradiated through the polyethylene film on a variable-speed conveyor belt traveling at 50 meters per minute below a Hanovia lamp (80 W/cm, interval 8 cm).

TABLE 1

| Formulation | 1a | 1b | 1c |
| --- | --- | --- | --- |
| Oligoalcohols | | | |
| I | 100 | — | — |
| V | — | 100 | — |
| IV | — | — | 100 |
| Initiator | | | |

TABLE 1-continued

| Formulation | 1a | 1b | 1c |
|---|---|---|---|
| II | 6 | 6 | 6 |
| Diisocyanate | 9 | 16.5 | 22 |

The delamination resistance of the composite films was determined immediately and after 10 days. The results obtained are shown in Table 2.

TABLE 2

| | Immediately | After 10 days |
|---|---|---|
| Formulation 1a | 100 | 540 p/15 mm |
| Formulation 1b | 90 | 370 p/15 mm |
| Formulation 1c | 110 | 420 p/15 mm |

EXAMPLE 2

The procedure described in Example 1 was repeated with the exception that the reaction product of 3 moles of tolylene diisocyanate and 1 mole of trimethylol propane was used as the polyisocyanate. The mixtures shown in Table 3 were tested.

TABLE 3

| Formulation | 2a | 2b | 2c | 2d | 2e |
|---|---|---|---|---|---|
| Oligoalcohols | | | | | |
| I | 100 | — | — | — | — |
| II | — | 100 | — | — | — |
| III | — | — | 100 | — | — |
| IV | — | — | — | 100 | — |
| V | — | — | — | — | 100 |
| Initiator | | | | | |
| I | — | — | 15 | 6 | — |
| II | 6 | 15 | — | — | 6 |
| Polyisocyanate | 16 | 6.5 | 9.5 | 40 | 30 |

The delamination strengths after different irradiation times (m/minute) were determined immediately and after 3 days. The results obtained are shown in Table 4.

TABLE 4

| | Irradiation Time | Immediately | After 3 Days |
|---|---|---|---|
| Formulation 2a | 30 m/min. | 120 | 580 p/15 mm |
| | 100 m/min. | 70 | 610 p/15 mm |
| Formulation 2b | 50 m/min. | 80 | 420 p/15 mm |
| Formulation 2c | 50 m/min. | 50 | 370 p/15 mm |
| Formulation 2d | 30 m/min. | 160 | 520 p/15 mm |
| Formulation 2e | 30 m/min. | 140 | 580 p/15 mm |

EXAMPLE 3

The procedure was as in Example 2, except that the 5-ethyl-methylolacryloyl-1,3-dioxane (U.S. Pat. No. 4,076,727) was additionally used as reactive diluent. The mixtures shown in Table 5 were tested.

TABLE 5

| Formulation | 3a | 3b | 3c |
|---|---|---|---|
| Oligoalcohols | | | |
| I | 100 | — | — |
| II | — | 100 | — |
| III | — | — | 100 |
| Initiator | | | |
| I | — | — | 15 |
| II | 15 | 15 | — |
| Reactive diluent | 50 | 50 | 50 |
| Polyisocyanate | 10 | 6.5 | 9.5 |

The delamination strengths after an irradiation time of 50 m/minute were obtained immediately and after 3 days. The results obtained are set out in Table 6.

TABLE 6

| | Immediately | After 3 Days |
|---|---|---|
| Formulation 3a | 110 | 540 p/15 mm |
| Formulation 3b | 120 | 470 p/15 mm |
| Formulation 3c | 70 | 320 p/15 mm |

EXAMPLE 4

The procedure was as in Example 1, except that benzil dimethyl ketal and benzophenone/triethanolamine were used as initiators. The mixtures shown in Table 7 were tested.

TABLE 7

| Formulation | 4a | 4b | 4c | 4d |
|---|---|---|---|---|
| Oligoalcohols | | | | |
| I | 100 | 100 | — | — |
| V | — | — | 100 | 100 |
| Benzildimethyl ketal | 1.5 | — | 1.5 | — |
| Benzophenone/ triethanolamine | — | 1.5/1.5 | — | 1.5/1.5 |
| Diisocyanate | 9 | 9 | 16 | 16 |

The delamination strengths of the composite films after an irradiation time of 30 m/minute were determined immediately and after 3 days. The results obtained are shown in Table 8.

TABLE 8

| | Immediately | After 3 Days |
|---|---|---|
| Formulation 4a | 60 | 510 p/15 mm |
| Formulation 4b | 140 | 320 p/15 mm |
| Formulation 4c | 40 | 430 p/15 mm |
| Formulation 4d | 30 | 270 p/15 mm |

EXAMPLE 5

The formulations in Table 1 were processed in the same way as in Example 1 except that, before lamination, the adhesive was directly irradiated at an irradiation speed of 10 m/minute. The delamination strength of the composite films was determined immediately and after 1 day. The results are shown in Table 9.

TABLE 9

| | Immediately | After 1 Day |
|---|---|---|
| Formulation 5a | 70 | 340 p/15 mm |
| Formulation 5b | 70 | 320 p/15 mm |

COMPARISON EXAMPLE

For comparison purposes, a polyalcohol (alcohol A: ethoxylated trimethylol propane, OH number 250, alcohol B: both propoxylated and also ethoxylated trimethylol propane, OH number 174), a mixture of 4,4'- and 2,4-diisocyanato diphenyl methane (40/60) and, optionally, a photoinitiator were mixed as shown in Table 10.

TABLE 10

| Formulation | 5c | 5d | 5e | 5f | 5g | 5h |
|---|---|---|---|---|---|---|
| Alcohol A | 100 | 100 | 100 | — | — | — |
| Alcohol B | — | — | — | 100 | 100 | 100 |
| Diisocyanate | 65 | 65 | 65 | 52 | 52 | 52 |
| Initiator I | 3 | — | — | 3 | — | — |

TABLE 10-continued

| Formulation | 5c | 5d | 5e | 5f | 5g | 5h |
|---|---|---|---|---|---|---|
| Initiator II | — | 3 | — | — | 3 | — |

The mixtures obtained were applied in quantities of approximately 2 g/m² to a polyethylene film pretreated by corona discharge, a polyamide film placed on top and the composite film thus obtained irradiated through the polyethylene film on a variable-speed conveyor belt traveling below a Hanovia lamp (80 W/cm, interval 8 cm) at speeds of (a) 5 m/minute, (b) 20 m/minute and (c) 50 m/minute.

None of the samples tested showed an initial adhesion of greater than 30 p/15 mm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for bonding a film to a substrate comprising:
  (a) applying a layer from 0.5 to 20 μm thick of an adhesive which may be cross-linked by high energy radiation to the film to be bonded,
  (b) contacting the film of (a) with the substrate, and
  (c) subjecting the adhesive to high energy radiation wherein the adhesive is a mixture of
    (i) at least one polyisocyanate and
    (ii) at least one compound containing both a (meth)acryloyl group and a hydroxyl group in which the equivalent ratio of hydroxyl groups to isocyanate groups is from 0.8:1 to 1.3:1.

2. The process of claim 1 wherein the substrate is a film of the same composition as the film to be bonded.

3. The process of claim 1 wherein the adhesive contains a photoinitiator.

4. The process of claim 1 wherein the adhesive contains a copolymerizable monomer.

5. The process of claim 1 wherein the adhesive contains additives and auxiliaries known to those in the art.

6. The process of claim 1 wherein the adhesive contains a photoinitiator, a copolymerizable monomer and other additives and auxiliaries.

7. The process of claim 2 wherein the adhesive is cross-linked by electron beams or ultraviolet light before the films have been contacted to form a composite.

8. The process of claim 2 wherein the adhesive is cross-linked by electron beams or ultraviolet light while the films are being contacted.

9. The process of claim 2 wherein the adhesive is cross-linked by electron beams or ultraviolet light after the films are in contact with each other.

10. The process of claim 1 wherein the polyisocyanate is an aromatic diisocyanate selected from the group consisting of 2,4-diisocyanatotoluene, 2,6-diisocyanatotoluene, mixtures of 2,4- and 2,6-diisocyanatotoluenes, 2,4'-diisocyanato diphenyl methane, 4,4'-diisocyanato diphenyl methane, mixtures of 2,4'- and 4,4'-diisocyanato diphenyl methanes and isocyanate-group-containing reaction products of these diisocyanates with dihydric and/or trihydric alcohols having a molecular weight of from 62 to 700.

11. The process of claim 1 wherein the compound (ii) has an OH number of from 20 to 600, contains (on a statistical average) from 1 to 3 hydroxy groups per molecule and from 0.012 to 1.12 olefinic double bonds in the form of (meth)acryloyl groups for each 100 molecular weight units.

* * * * *